Feb. 25, 1941.　　　F. N. LARSON　　　2,232,682
CONNECTING ROD GUIDE
Filed March 15, 1939　　　2 Sheets-Sheet 1

Inventor
F. N. Larson

By Clarence A. O'Brien
and Hyman Berman
Attorneys

Feb. 25, 1941.　　　F. N. LARSON　　　2,232,682
CONNECTING ROD GUIDE
Filed March 15, 1939　　　2 Sheets-Sheet 2
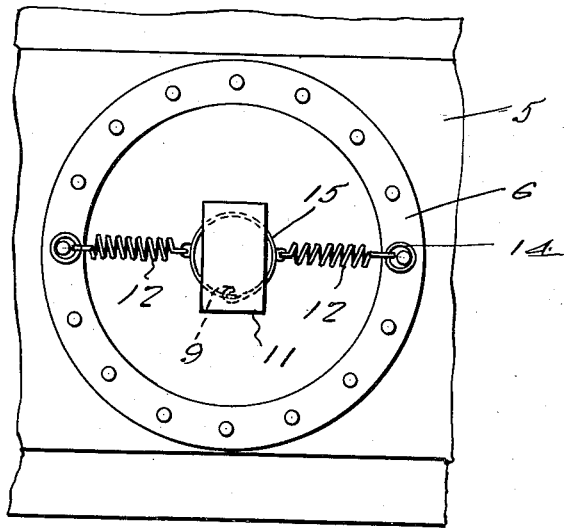
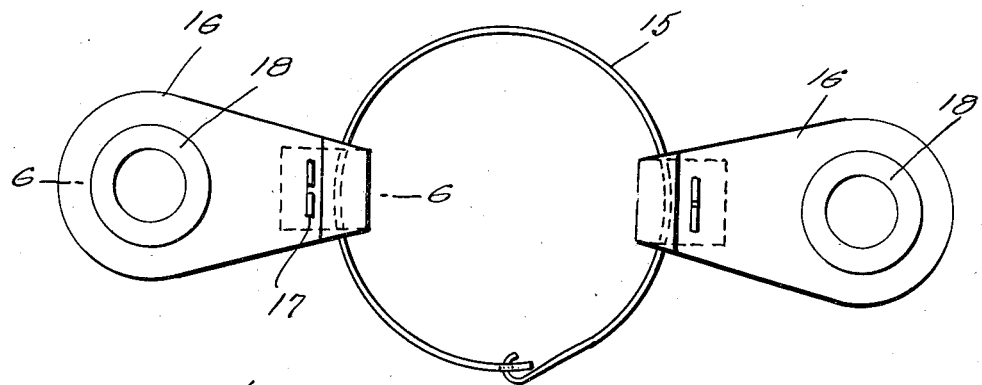
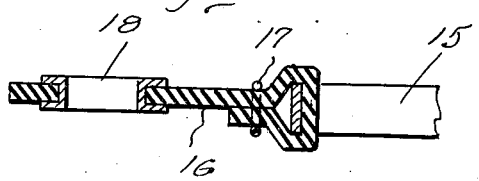
Inventor
F. N. Larson
By Clarence A. O'Brien
and Hyman Berman
Attorneys Patented Feb. 25, 1941

2,232,682

UNITED STATES PATENT OFFICE 2,232,682

CONNECTING ROD GUIDE

Frederick N. Larson, Coco Solo, C. Z.

Application March 15, 1939, Serial No. 262,053

3 Claims. (Cl. 29—84)

This invention appertains to new and useful improvements in adjuncts for use in conjunction with engines while on the assembly line in manufacturing plants.

The principal object of the present invention is to provide a connecting rod guide especially adapted for use on radial type aircraft engines to the end that the connecting rod can be held against slapping action with the wall of the crankcase when the crankshaft is being turned over, as for instance when the timing mechanism is being set.

Other objects and advantages of the invention will become apparent to the reader of the following specification.

In the drawings—

Figure 2 is a fragmentary top plan view.

Figure 5 is a top plan view of a slightly modified form of the invention.

Figure 6 is a section on the line 6—6 of Figure 5.

Figure 1:
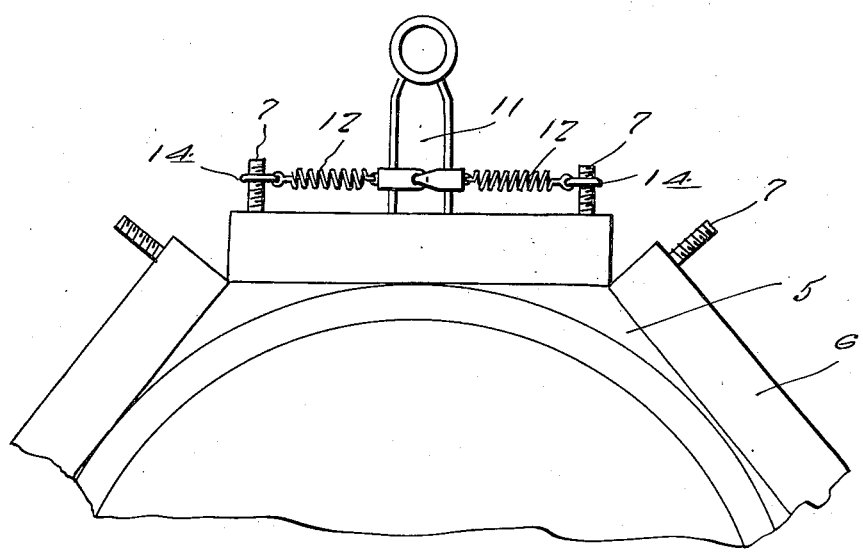
Figure 1 represents a fragmentary side elevational view.
Figure 3:
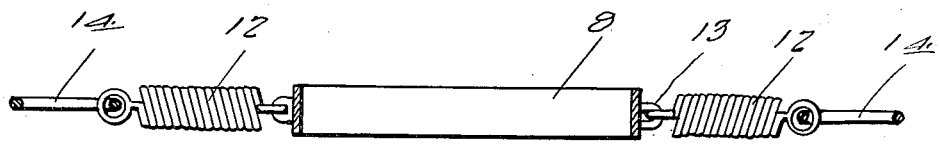
Figure 3 is a longitudinal sectional view through the guide.
Figure 4:
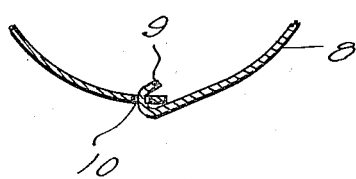
Figure 4 is a fragmentary sectional view through the guide band.

Referring to the drawings wherein like numerals designate like parts, it can be seen in Figure 1, that numeral 5 represents the crankcase of a radial type aircraft engine with the usual annular cylinder attaching shoulder 6 protruding therefrom. Numeral 7 denotes the cylinder attaching threaded members projecting from the shoulder 6 and it is with a pair of diametrically opposite members 7 on each shoulder 6 that the present invention is associated with.

In carrying out the present invention, a metallic band 8 is employed, the same being of the split type and having one end reduced and formed in the nature of a hook 9 which is disposed through an opening 10 in the other end thereof.

The band thus formed serves as a guide for the connecting rod 11 when the band is properly supported by the tension springs 12—12. These tension springs each has one end connected to an eye 13 on the band 8 while its opposite end embraces a ring 14 which is disposed over the corresponding threaded member 7. Thus it can be seen that the connecting rod 11 cannot slap against the insides of the cylinder openings of the case 5 when the crankshaft is being turned over.

A modified form of the invention is shown in Figure 5 wherein the band 15 is constructed in like manner, but wherein a pair of tapered rubber plates 16—16 are employed instead of the springs 12, these rubber plates having their reduced ends looped over diametrically opposite portions of the band 5 and then clipped together by wire clips or the like 17. Thus the tapered sheet members 16 are secured to the band 15. Their enlarged portions are formed with openings and through these are disposed metallic eyelets 18 of the channeled type shown in Figure 6, these eyelets being adapted to be disposed over corresponding threaded members 7 as are the rings 14 of the form of the invention shown in Figure 1.

Obviously with the present invention involving the springs, the springs will serve to pull outwardly the connecting rods as they pass bottom dead-center. In the use of rubber bands and the like contemplated for the same purpose, the rubber bands frequently break and fall into the crankcase and sometimes result in the clogging of an oil line.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. For use with an engine crank case having cylinder-attaching threaded members projecting therefrom, a connecting rod guide comprising a split band-like member for temporarily receiving and guiding a connecting rod, and members extending from the band and having eyes at their outer ends for disposition with certain of the said threaded cylinder-attachable members for supporting said guide in operative position.

2. For use with an engine crank case having cylinder-attaching threaded members projecting therefrom, a connecting rod guide comprising a split band-like member for temporarily receiving and guiding a connecting rod, and members extending from the band and having eyes at their outer ends for disposition with certain of the said threaded cylinder-attachable members for supporting said guide in operative position, said split band having a hook and eye connection at its ends.

3. For use with an engine crank case having cylinder-attaching threaded members projecting therefrom, a connecting rod guide comprising a split band-like member for temporarily receiving and guiding a connecting rod, and members extending from the band and having eyes at their outer ends for disposition with certain of the said threaded cylinder-attachable members for supporting said guide in operative position, said members extending from the band consisting of tension springs.

FREDERICK N. LARSON.